United States Patent
Robertson et al.

(10) Patent No.: US 10,735,539 B1
(45) Date of Patent: Aug. 4, 2020

(54) PUBLISH/SUBSCRIBE SYSTEM BROKER

(71) Applicant: Verizon Patent and Licensing Inc., Arlington, VA (US)

(72) Inventors: James A. Robertson, The Woodlands, TX (US); Ray A. Sears, Grass Valley, CA (US); Justin Wallace Vandiver, Bound Brook, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/282,863

(22) Filed: Feb. 22, 2019

(51) Int. Cl.
| | |
|---|---|
| *G06F 15/16* | (2006.01) |
| *H04L 29/08* | (2006.01) |
| *H04L 12/24* | (2006.01) |
| *G06F 9/455* | (2018.01) |
| *H04L 12/741* | (2013.01) |

(52) U.S. Cl.
CPC .......... *H04L 67/26* (2013.01); *G06F 9/45558* (2013.01); *H04L 41/0806* (2013.01); *H04L 45/54* (2013.01); *H04L 67/2809* (2013.01); *G06F 2009/45595* (2013.01)

(58) Field of Classification Search
USPC ....... 709/203, 206, 217, 219, 223, 224, 226, 709/228, 230, 232, 238; 1/1
See application file for complete search history.

(56) References Cited

U.S. PATENT DOCUMENTS

| | | | |
|---|---|---|---|
| 2007/0208800 A1* | 9/2007 | Frohlich .............. | G06F 21/602 709/203 |
| 2018/0018688 A1* | 1/2018 | Soon-Shiong ......... | G06Q 30/02 |
| 2019/0279243 A1* | 9/2019 | Soon-Shiong ....... | G06Q 20/227 |

\* cited by examiner

*Primary Examiner* — Quang N Nguyen (57) ABSTRACT

A device can receive a plurality of input event objects that correspond to publications in a publication-subscription deployment, where the plurality of input event objects are associated with respective originating accounts and respective originating signatures. The device can identify, using a query, a set of input event objects, of the plurality of input event objects, based on which of one or more operations are to be invoked, where the query is based on the respective originating accounts and the respective originating signatures, and where the query returns respective output signatures corresponding to the set of input event objects. The device can generate one or more output event objects that include or identify the respective output signatures corresponding to the set of input event objects, and provide, to an event bus, the one or more output event objects to cause the one or more operations to be invoked.

20 Claims, 7 Drawing Sheets

PUBLISH/SUBSCRIBE SYSTEM BROKER

BACKGROUND

Publish-subscribe (pub/sub) is a messaging pattern where devices sending messages, called publishers, do not program the messages to be sent directly to specific receiving devices, called subscribers, but instead categorize published messages into classes without knowledge of which subscribers, if any, there can be. Similarly, subscribers express interest in one or more classes and only receive messages that are of interest, without knowledge of which publishers, if any, are associated with the system. A system using a pub/sub pattern can be referred to as a pub/sub system.

DETAILED DESCRIPTION OF PREFERRED EMBODIMENTS

The following detailed description of example implementations refers to the accompanying drawings. The same reference numbers in different drawings can identify the same or similar elements.

A pub/sub system can generate (e.g., publish) an event object based on an event. For example, an event can include the creation, modification, or deletion of a resource (e.g., a virtual machine, a virtual link, etc.), an account management operation, and/or the like. In some cases, an event can be based on a user action or can be based on an automatic action. An event can be associated with a particular account, which can be referred to as an originating account of the event. For example, the event can be performed in connection with the account or can be performed by a device associated with the account. Examples of accounts, events, and the like are provided in more detail elsewhere herein. "Event" can be used interchangeably with "event object" herein.

The published event object can be associated with a particular class. As just one example, an event associated with the creation of a resource can be associated with a resource creation class. Subscribers of a pub/sub system can subscribe to classes. A subscriber can be a device or virtual machine. A subscriber can receive an event object when the subscriber is subscribed to a class associated with the event object. For example, the pub/sub system can publish the event object to the subscriber based on the class of the event object and based on the subscriber being subscribed to the class. In some cases, a particular module of the pub/sub system can handle publication of event objects to an appropriate subscriber. For example, the particular module can be referred to as an event bus or an event bus module.

In some cases, the subscriber (e.g., a device, computing resource, virtual machine, etc.) can perform an action based on the event object. For example, the subscriber can determine that the event object matches a rule or rule set of the subscriber, and can perform an action or operation based on the event object matching the rule or rule set. In some cases, the action can be identified based on a function that identifies the rule and the corresponding action to be performed. One example of a pub/sub system is the Amazon Web Services (AWS) pub/sub system, in which events can be associated with the creation, modification, or deletion of AWS resources. In the AWS pub/sub system, the functions can be implemented using AWS's Lambda system, and can be colloquially referred to as "lambdas."

It can be inefficient and wasteful of resources to check an event object against rules of every subscriber to a class associated with the event object. Also, it might not always be desirable to trigger an action for a published event object, even when the published event object matches a rule that defines the action. As an example, consider the case where a first account is associated with a development team and a second account is associated with a production team. Assume that the action to be performed in this case relates to a security audit for a newly created resource. In this case, it can be wasteful of processing resources to perform the security audit when the newly created resource is associated with the development account, since the newly created resource is likely in a development stage and is not yet to be deployed to a production stage. In some pub/sub systems, the event object associated with the newly created resource would be published to all subscribers of the corresponding class when generated by the development account, so the event object would be indiscriminately checked against rules of all of these subscribers, thereby wasting resources of the subscribers and possibly triggering undesirable action to be taken.

Some implementations described herein provide a pub/sub platform that selectively triggers rules or actions for an event object based on one or more parameters associated with the event object, such as an originating account, an event type of the event object, a tag associated with the event object, and/or the like. As just one example, the rules or actions to be invoked can be associated with a development group (e.g., a set of subscribers for testing a newly created resource), rather than a production group (e.g., all subscribers). As another example, the rules or actions to be invoked can be selected based on an external variable, such as a time of day, a current load of a resource, and/or the like. In some implementations, the pub/sub platform can publish custom event objects, based on an input event object, to cause the particular rules or actions to be invoked. For example, the pub/sub platform can identify the custom event objects to be created based on a query, can generate the custom event objects, and can publish the custom event objects to an event bus of the pub/sub platform. The custom event objects can cause particular actions to be invoked (e.g., based on matching particular rules). In some implementations, the custom event objects can be referred to as output event objects.

In this way, the pub/sub platform can conserve computing resources of the recipients of the event objects by selecting particular event objects to be forwarded and/or generating custom event objects to trigger particular rules. Furthermore, the pub/sub platform can conserve computing resources of the pub/sub platform that would otherwise be used to indiscriminately publish all event objects to the event bus. For example, the pub/sub platform can determine, in some instances, that an event object is to be dropped rather than published to the event bus. Still further, the pub/sub platform can enable more fine-tuned execution of actions or operations for particular event objects in comparison to indiscriminate publication of the particular event objects to all subscribers, thereby simplifying the process of developing and deploying resources and conserving computing resources that would otherwise be used to provide isolated development environments separate from the pub/sub platform.

In some cases, the pub/sub platform can be maintained using a combination of top-down configuration information (e.g., global information associated with account configuration and/or a central account of the pub/sub system) and bottom-up configuration information (e.g., configuration information that identifies configurations of particular rule sets, particular custom event objects, and/or the like). Appropriate modifications to particular data structures of the pub/sub system can be automatically propagated to the particular data structures upon receiving top-down or bottom-up configuration information. Thus, simplicity and efficiency of maintaining the data structures used to implement the implementations described herein can be improved. Furthermore, some implementations described herein can use a data structure described herein to identify a custom event object using a single query (e.g., a single Structured Query Language query and/or the like), thereby conserving processing resources that would otherwise be used to perform a more complicated set of queries to identify custom event objects to be generated. The structure and operation of the data structure is described in more detail in connection with FIG. 1D.

FIGS. 1A-1D are diagrams of an example implementation 100 and an example data structure schema 136 described herein.

Figure 1A:
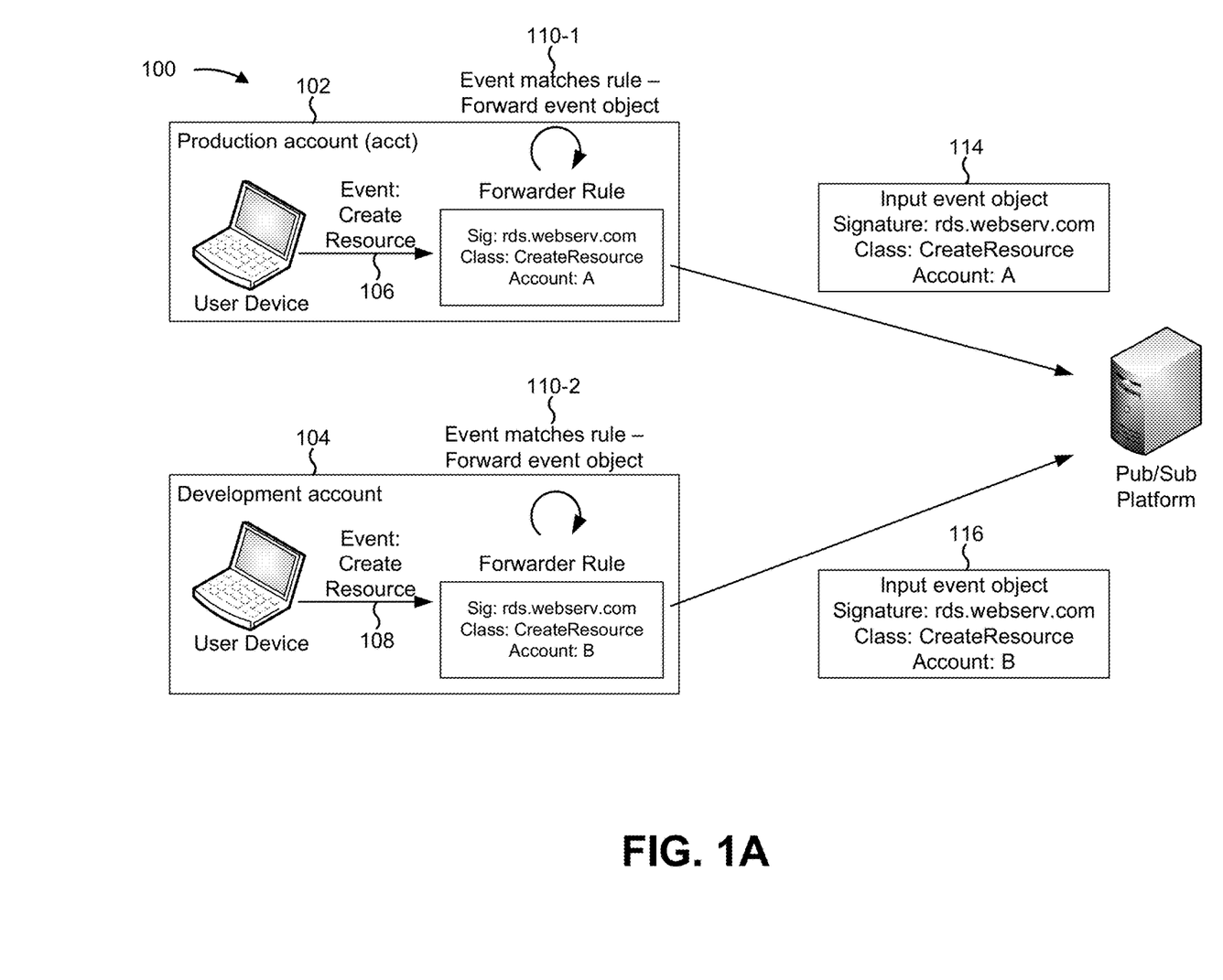
FIGS. 1A-1D are diagrams of an example implementation described herein.

As shown in FIG. 1A, and by reference number 102, a pub/sub system can be associated with a production account. As shown by reference number 104, the pub/sub system can be associated with a development account. Here, the production account and the development account are shown in association with respective user devices, which are shown separately from a pub/sub platform of the pub/sub system. In some implementations, the production account and/or the development account can be implemented as part of the pub/sub platform (e.g., using computing resources of the pub/sub platform, etc.).

As shown by reference numbers 106 and 108, the user devices associated with the production account and the development account can each trigger an event associated with the creation of a resource. For example, the user devices associated with the production account and the development account can each trigger the deployment of a resource, such as a virtual machine, a runtime, a virtual network function, and/or the like. In some implementations, the event can be related to a different occurrence, such as receiving an email, scheduling an event, logging a value, generating a notification, updating a data structure, triggering a synchronization operation, creating a file, moving a file, deleting a file, modifying a file, and/or the like.

The events generated by the respective user devices can be associated with respective event objects. These event objects can be referred to as input event objects. An input event object can include an event object that can be generated natively by the pub/sub system (e.g., as compared to a custom event object, described in more detail below). If an input event object is published to an event bus, then each subscriber to a class associated with the input event object can check the input event object against a set of rules, and can invoke actions for rules that the input event object matches. However, this can be undesirable for a variety of reasons. As one example, it can be wasteful of resources to invoke actions every time a rule matches an event object, particularly when the action would be unnecessary or frivolous. As a related example, it might not be desirable to invoke particular rules (e.g., security auditing rules, other types of "global" rules, and/or the like) for an event object corresponding to a resource that is only to see limited deployment (e.g., a resource in development and/or the like). As yet another example, it can be wasteful to invoke actions irrespective of external variables associated with the pub/sub platform or the actions. For example, it can be wasteful of computing resources to invoke an action associated with load balancing during off-peak hours.

As shown, each account or each user device can be associated with a forwarder rule. The forwarder rule can forward an event object when an event, generated by the account or user device, matches the rule. The forwarder rule can conserve computing and/or network resources that would otherwise be used to provide all events generated by the user devices and/or the accounts to the pub/sub platform. For example, the forwarder rule can enable the dropping of certain events or classes of events while publishing other events or classes of events. In some implementations, the forwarder rule can be a hybrid publisher-subscriber. For example, the forwarder rule can subscribe to particular classes of event object from the user devices, and can publish the event objects associated with the particular classes to the pub/sub platform. As shown by reference number 110-1 and 110-2, the respective forwarder rules indicate that event objects associated with the events indicated by reference numbers 106 and 108 are to be forwarded to the pub/sub platform. Accordingly, the respective forwarder rules can cause the event objects to be forwarded.

In some implementations, a forwarder rule can cause an event object to be generated based on an event. In some implementations, a forwarder rule can cause an event object to be forwarded based on an event. In some implementations, a forwarder rule can cause an event object to be modified before forwarding the event object.

In some implementations, a forwarder rule can indicate that an event object is to be forwarded based on an account group. For example, the forwarder rule can be configured so that an event object associated with an account that belongs to a first account group is forwarded and an event object associated with an account that belongs to a second account group is not forwarded. As an example, the forwarder rule can indicate that event objects associated with development and production accounts are to be forwarded, and that event objects associated with test accounts are not to be forwarded. Thus, the forwarder rule can conserve computing and communication resources that would otherwise be used to indiscriminately forward event objects.

As shown, the event objects generated or forwarded based on the forwarder rules include information identifying respective signatures and accounts. A signature can include information to be used to determine whether a particular action should be invoked based on an event object. For example, a signature can include a class associated with the event object, a source of the event object (e.g., a domain, a user device, etc.), and/or the like. The information identifying the account can identify an originating account of the event object. Here, Account A is the production account and Account B is the development account.

As shown by reference number 114, the production account (or the user device associated with the production account) can provide an input event object for Account A to the pub/sub platform based on the forwarder rule. Similarly, as shown by reference number 116, the development account (or the user device associated with the development account) can provide an input event object for Account B to the pub/sub platform based on the forwarder rule.

Figure 1B:
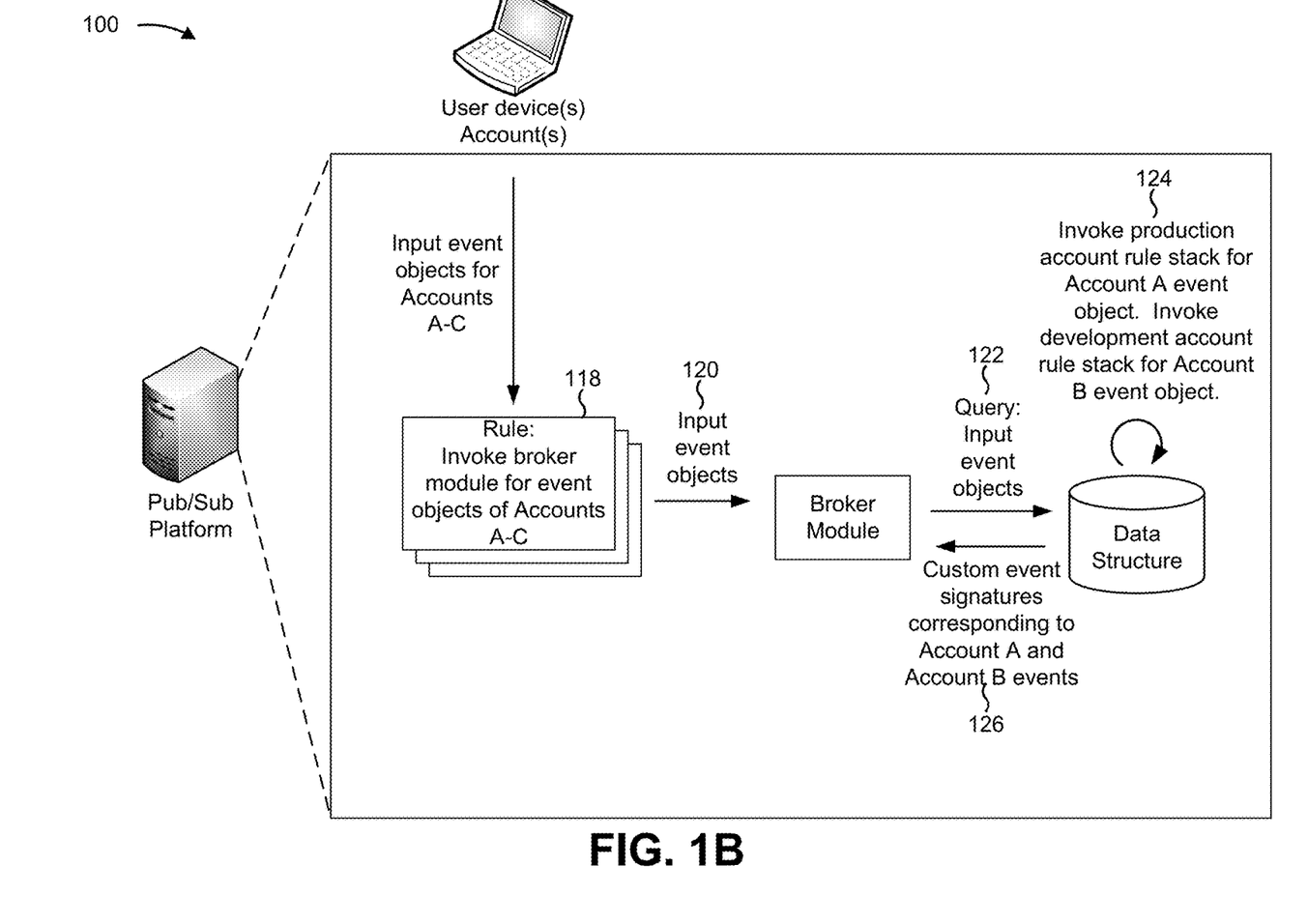

As shown in FIG. 1B, the pub/sub platform can receive the input event objects from the user devices or the accounts that generated the input event objects. For example, and as shown, the pub/sub platform can receive the input event objects from Accounts A through C. Account C is not shown or described in connection with FIG. 1A, and is described here to illustrate the dropping of an input event object. As shown by reference number 118, a rule of the pub/sub platform can indicate that a broker module is to be invoked for input event objects associated with Accounts A through C. In some implementations, the rule of the pub/sub platform can indicate that the broker module is to be invoked based on account groups associated with the input event objects, signatures associated with the input event objects, and/or the like. By selectively invoking the broker module only for event objects that are associated with particular accounts, particular account groups, particular signatures, and/or the like, the pub/sub platform can conserve processing resources that would otherwise be used to generate queries for input event objects that are not associated with an account, an account group, a signature, and/or the like, for which custom event objects are to be generated.

As shown by reference number 120, the rule can invoke the broker module for the input event objects associated with Accounts A through C. For example, the broker module can identify a set of actions to be performed for input event objects that match the rule indicated by reference number 118. As shown by reference number 122, the broker module can provide a query to a data structure based on the input event objects. For example, the actions invoked by the rule can include generating and providing the query. As shown, the query can identify the input event objects or can be based on the event input objects. For example, the query can identify the signatures of the input event objects, the accounts associated with the input event objects, and/or the like. The query can return, from a data structure, information identifying a set of custom event objects to be published to an event bus in order to invoke particular actions, as described in more detail below.

In some implementations, the query can include a parameter or criterion. For example, the query can identify a time of day associated with an input event object, a resource type associated with an input event object, a geographical location associated with an input event object, and/or the like. Thus, the query can improve versatility of identification of custom event objects to be generated for input event objects, thereby enabling more fine-grained control over which actions are invoked for a particular input event object. This conserves computing resources that would otherwise be used to indiscriminately publish input event objects.

As shown by reference number 124, in this case, the data structure can indicate that a first rule set (e.g., a first set of rules) is to be invoked for the input event object associated with Account A, and that a second rule set (e.g., a second set of rules) is to be invoked for the input object associated with Account B. Here, the first rule set is associated with one or more production accounts, and the second rule set is associated with one or more development accounts. Thus, it can be said that the scope of the first rule set is a production scope, and the scope of the second rule set is a development scope.

Note that the data structure does not indicate that a rule set is to be invoked for the input event object associated with Account C. In this case, the data structure might not return a custom event signature for the input event object associated with Account C. Thus, an action might not be invoked for the input event object associated with Account C, even if the input event object associated with Account C matches the same rule as an input event object associated with Account A or B. This conserves processing resources of the pub/sub platform and provides for the selective application of rules based on originating accounts of input event objects. In some implementations, the pub/sub platform can determine that the input event object associated with Account C is not to be provided to the broker module based on a rule for which input event objects are to be provided to the broker module, such as the rule indicated by reference number 118. This can conserve processing resources that would otherwise be used to perform the query shown by reference number 122 for Account C.

As shown by reference number 126, a result of the query can indicate custom event signatures corresponding to the input event objects of Account A and Account B. For example, the data structure can identify mappings between input event objects (e.g., an account, a signature, a tag, a parameter, a criterion, etc.) and custom event objects. The custom event object can be associated with a signature that causes a rule set to invoke a particular action. For example, if the particular action is to be invoked upon the creation of a new resource by a production account, the rule set can be configured to invoke the particular action when a particular custom event signature is detected, and the particular custom event signature can be added to the data structure in association with the production account (or a production account group) and an input event signature associated with the generation of a new object. Thus, the query can return the particular custom event signature, which can be used to invoke the particular action, as described in more detail below.

In some implementations, the query can be a single query. For example, the broker module can provide a single query based on the input event objects corresponding to Accounts A, B, and C to determine which custom events are to be generated. An example schema or structure of the data structure is described in more detail in connection with FIG. 1D. This schema can provide for the determination of the custom events using the single query, which conserves processing resources of the broker module and the data structure.

Figure 1C:
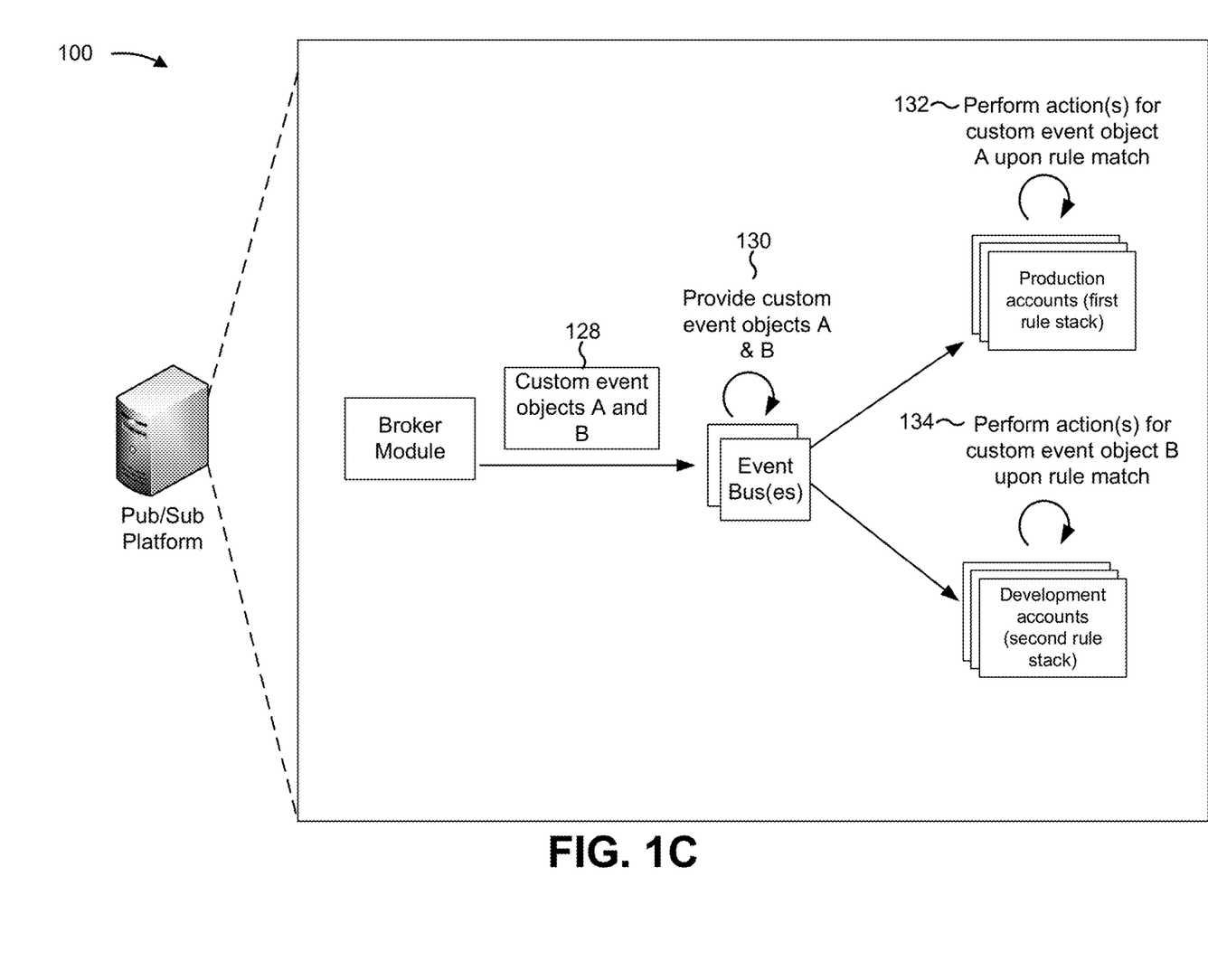

As shown in FIG. 1C, and by reference number 128, the broker module can publish custom event objects to one or more event buses based on the custom event signature. For example, the broker module can be associated with one or more rules to cause a custom event object to be generated based on a custom event signature and/or to be published or provided to an appropriate event bus. In some implementations, the broker module can generate a custom event based on a custom event signature. For example, the broker module can generate an event that includes the custom event signature, can generate an event with one or more attributes that are based on the custom event signature, and/or the like.

In some implementations, each account can be associated with a corresponding event bus, and an event object that is to be provided to an account can be published to the corresponding event bus. For example, a set of production accounts (e.g., a set of recipient accounts associated with the rule set for production accounts) can be associated with a corresponding set of event buses, and a set of development accounts (e.g., the set of development accounts associated with the rule set for development accounts) can be associated with another corresponding set of event buses. The broker module can publish the custom event object for Account A (shown as custom event object A) to the set of event buses corresponding to the set of production accounts, and can publish the custom event object for Account B (shown as custom event B) to the set of event buses corresponding to the set of development accounts. Thus, the pub/sub platform can conserve processing resources of devices associated with Account A and/or Account B that would otherwise be used to apply the respective rule sets of Account A and/or Account B, even if the input event object is out of scope for the corresponding account.

As shown by reference number 130, the one or more event buses can provide the custom event objects to corresponding subscribers or recipient accounts. For example, a first set of event buses, corresponding to the set of production accounts, can provide custom event object A to the set of production accounts (e.g., for execution of the rule set associated with the set of production accounts). Similarly, a second set of event buses, corresponding to the set of development accounts, can provide custom event object B to the set of development accounts (e.g., for execution of the rule set associated with the set of development accounts).

As shown by reference number 132, a first set of recipient accounts (e.g., the set of production accounts) can perform one or more actions for custom event object A. As shown by reference number 134, a second set of recipient accounts (e.g., the set of development accounts) can perform one or more actions for custom event object B. In the virtual machine deployment example described above, the actions performed by the set of production accounts can include actions related to deployment of new virtual machines to an environment, such as security audits and/or the like. Continuing with the virtual machine employment example, the actions performed by the set of development accounts might not include the actions related to deployment of the virtual machines, thereby saving processing resources of the set of development accounts and preventing premature performance of the actions associated with the set of production accounts. In some implementations, the set of development accounts can perform different actions than the set of production accounts, such as a development-related action (e.g., a documentation action, an implementation action, a version-checking action, and/or the like) and/or the like.

In this way, the pub/sub platform provides selective publication of input event objects to particular accounts, thereby improving control over which actions are performed for a particular input event object. For example, the pub/sub platform can provide selective publication based on an account group from which an input event object originates, thereby enabling differential treatment of input event objects based on originating accounts or account groups of the input event objects (e.g., a development account group versus a production account group). Thus, processing resources are conserved that would otherwise be used to publish an input event object to all accounts subscribed to a class of the input event object. Furthermore, processing resources are conserved that would otherwise be used to perform actions that are out-of-scope for a particular event object based on the originating account group of the event object.

Many implementations described herein are described in the context of a pub/sub system. For example, implementations described herein might trigger an action and/or deliver a custom event object using a pub/sub system, as described elsewhere herein. However, the implementations described herein are not limited to those involving a pub/sub system. It is contemplated that any form of directing a particular action to be performed by a particular recipient may be used. For example, a RESTful service call may be used, wherein, instead of a custom event signature, the queried-for destination information is an address of a process to be invoked. Other examples include a message-queueing approach, a common object request broker architecture (CORBA)-based approach, and/or the like.

Figure 1D:
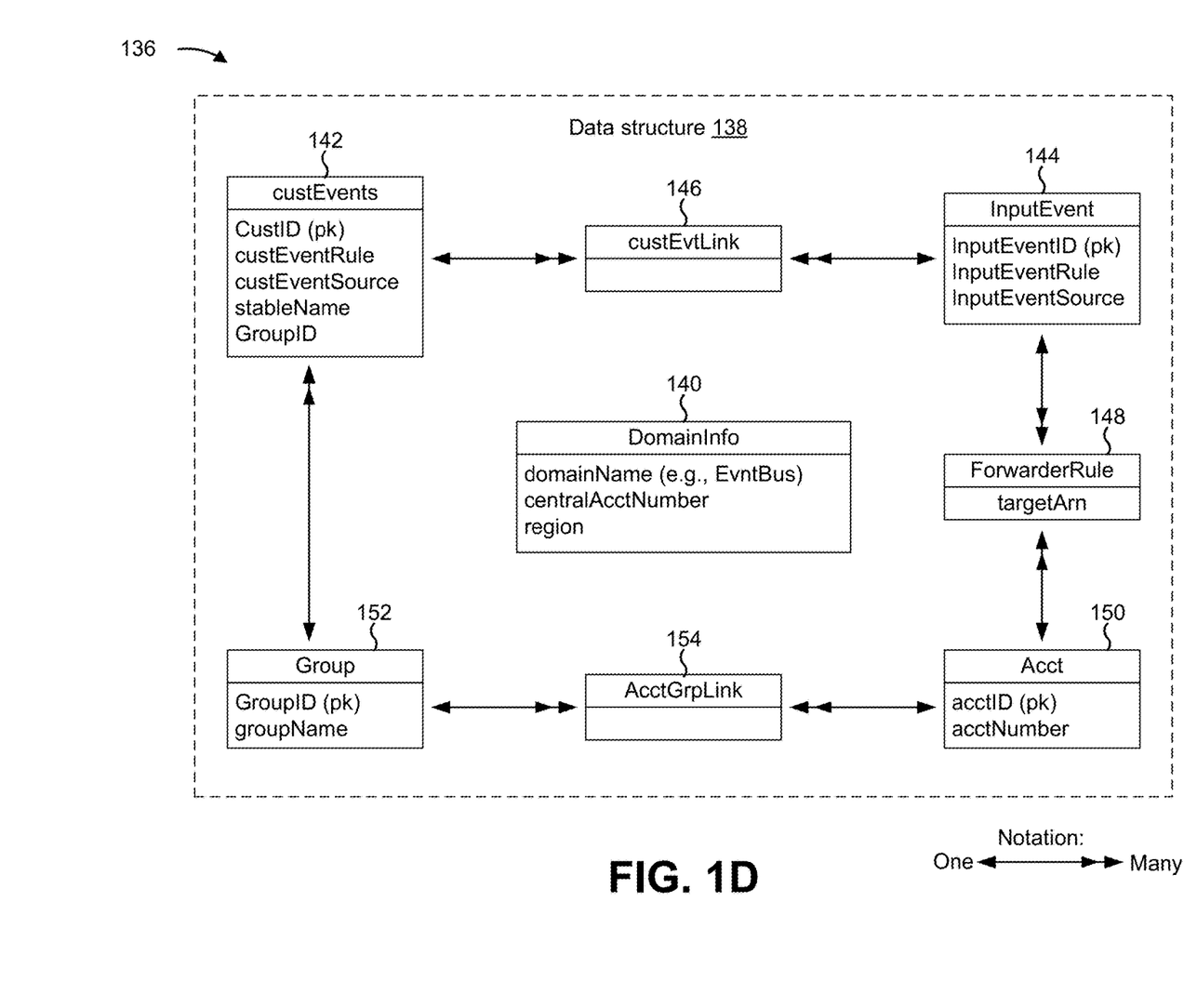

FIG. 1D is a diagram of an example data structure schema 136 described herein. In some implementations, a data structure 138 based on data structure schema 136 (e.g., the data structure shown in FIG. 1B and/or the like) can be implemented using a relational database system. In some implementations, a pub/sub platform can interact with the data structure 138 using a domain specific language, such as Structured Query Language (SQL) and/or the like. As shown, the data structure schema 136 can identify tables 140 through 154. Relationships between tables are shown using Shlaer-Mellor notation, wherein an arrow with two heads on a first end and one head on a second end indicates a many-to-one relationship (or a one-or-more-to-one relationship) between a table indicated by the first end and a table indicated by the second end.

Table 140 can include domain information. The domain information can identify global information or central account information for the pub/sub platform, such as a domain name (e.g., shown as EvntBus), a central account identifier (e.g., shown as centralAcctNumber, which can include a central account number, an identifier of an administration account, etc.), a region (e.g., information identifying a geographical region or service area associated with the pub/sub platform), and/or the like.

Table 142 can identify rule sets that are to be invoked for particular input events by reference to custom events corresponding to the particular input events. For example, table 142 can identify a stable name for a rule set (e.g., a descriptive name to identify the rule set that might not change from one build to the next, shown as stableName), a rule set identifier (e.g., shown as CustID, and which can be a primary key of table 142), a custom event rule (e.g., custEventRule, which can identify a string to be used as an action or event type of a custom event), a custom event source (e.g., custEventSource, which can identify a string to be used as a source of a custom event), a group identifier (e.g., identifying a group that the rule set is associated with), and/or the like. Here, CustID is a primary key of table 142, indicated by "pk," which can mean that each entry in table 142 is identified by a unique CustID value. The custom event rule and/or the custom event source can be the signature that is provided when a match between table 142 and 144 is found based on a query, as described in more detail below. In some implementations, the group identifier associated with table 142 can be indicated as part of deployment or build of table 142. For example, a deployment file can identify groups associated with various rule sets, and table 142 can be populated based on the deployment file.

Table 144 can identify input event objects based on rules and/or sources of the input event objects. For example, table 144 can identify an input event identifier (e.g., InputEventID, which can be a primary key of table 144, and which can uniquely identify each row of table 144), an input event rule (e.g., InputEventRule, which can identify an action or event type associated with the input event object), an input event source (e.g., InputEventSource, which can identify a service or environment that generated the input event object), and/or the like. The input event rule and the input event source can be collectively referred to as the signature of an input event object. The signature can be used in connection with an account identifier of an event to identify an appropriate custom event signature.

Table 146 can provide a mapping between the custom event signatures of table 142 and the input event signatures of table 144. For example, table 146 can be a link entity between table 142 and table 144. In some implementations, table 146 can include a first column identifying input event objects and a second column identifying custom event objects, and can identify a mapping between the input event objects and the custom event objects. This mapping, in connection with the mapping between custom events and account groups or accounts, can enable the identification of custom events based on input event signatures and originating accounts associated with the input event signatures.

Table 148 can be a forwarder rule that identifies mappings between accounts identified by table 150 and input event objects identified by table 144.

Table 150 can identify account identifiers (e.g., primary keys of table 150, or unique identifiers that identify each account number of table 150) and account numbers of accounts that can generate input events. For example, the account number can be configured (e.g., using top-down configuration information, described in more detail below), and the account identifier can be assigned as part of the generation of data structure 138. In some implementations, table 150 can identify accounts that can provide input event objects to the pub/sub platform.

Table 152 can identify a set of group identifiers (e.g., primary keys, or unique identifiers that identify each group of table 152) and group names (e.g., configured values as part of top-down configuration information, described in more detail below). Accounts identified by table 150 can be mapped to groups identified by table 152 using table 154. For example, table 154 can be a link entity between table 150 and table 152. More particularly, table 154 can include a first column identifying account identifiers and a second column identifying group identifiers. Table 154 can identify mappings between the account identifiers and the group identifiers. Thus, an appropriate custom event can be identified based on an originating account associated with the custom event and a group associated with the originating account, thereby enabling the triggering of custom events associated with particular groups (e.g., particular deployment scopes).

As one example, the query used to identify the custom event signature can be as follows:
SELECT set.custEventRule, set.custEventSource
FROM CustEvents AS set
INNER JOIN custEvtLink AS custevt
ON custevt.CustID=set. CustID
INNER JOIN InputEvent AS inputevt
ON inputevt.InputEventID=custevt.InputEventID
INNER JOIN Group AS grp
ON grp.GroupID=set. GroupID
INNER JOIN AccGrpLink AS acctgrp
ON acctgrp.GroupID=grp.GroupID
INNER JOIN Acct AS act
ON act.AcctID=acctgrp.AcctID
WHERE inputevt.inputEventRule=?
AND inputevt.inputEventSource=?
AND act.acctNumber=?

In the above query, the SELECT operation identifies the desired outputs of the data structure 136 (e.g., the custom event rule and custom event source, or collectively, the custom event signature). The inputs of the query are indicated by the question marks on the WHERE and AND operations (e.g., the input event rule, input event source, and originating account number of the input event object). The INNER JOIN and ON operations cause a six-way join of tables 142, 144, 146, 150, 152, and 154 based on custom event identifier values, input event identifier values, group identifiers, and account identifiers of the tables. Thus, a single query can provide information identifying a custom event signature to invoke one or more rule sets based on an input event object signature and an originating account (e.g., account group, deployment scope, etc.) associated with the input event object.

In some implementations, tables 140, 150, 152, and/or 154 can be configured using top-down configuration information. For example, tables 140, 150, 152, and/or 154 can be configured based on global information. As another example, tables 140, 150, 152, and/or 154 can be configured using a configuration file that applies to a full deployment of the pub/sub platform or to a central account of the pub/sub platform. As yet another example, tables 140, 150, 152, and/or 154 can be configured based on data that pertains to account management, rather than to particular rule sets. In some implementations, the configuration information can identify a domain name, a central account, and/or a region (e.g., the information associated with table 140). In some implementations, the configuration information can identify a set of accounts that are allowed to forward event objects to the pub/sub platform, which can be referred to as an account universe. In some implementations, the configuration information can identify groups of accounts. For example, the configuration information can identify a first set of accounts that are associated with a development group, a second set of accounts that are associated with a production group, and so on. The pub/sub platform can update tables 140, 150, 152, and/or 154 based on this configuration information.

In some implementations, tables 142, 144, and/or 146 can be updated using bottom-up configuration information. For example, tables 142, 144, and/or 146 can be configured based on parameters corresponding to particular rule sets, custom event objects, or input event objects. In some implementations, the bottom-up configuration information can identify a rule set based on a stable name for the rule set. Furthermore, the bottom-up configuration information can identify a custom event signature for the rule set, an input event signature on which the rule set is to be triggered, a deployment scope for the rule set (e.g., an account group or a set of accounts for which the rule set is to be invoked), a region for the rule set, a domain name for the rule set, and/or the like. The pub/sub platform can update tables 142, 144, and/or 146 as necessary based on the bottom-up configuration information. In some implementations, the pub/sub platform can update a rule of the broker module based on the bottom-up configuration information. For example, the pub/sub platform can update the rule so that the broker module generates a query for data structure 138 when an input event signature is identified by the bottom-up configuration information.

A more detailed example of a process for updating data structure 138 based on bottom-up configuration information is provided below.

The pub/sub platform can receive configuration information identifying a stable name of a rule set (e.g., a stableName value of table 142). The pub/sub platform can query table 142 based on the stable name to determine whether a record with a matching stable name is included in table 142. If no matching record is found, then a new record with the specified stable name can be inserted into table 142. Next, the pub/sub platform can generate a pair of unique custom event signature strings. As just one example, the pair of custom event signature strings can use a convention such as stableName+["_Source" or "_Rule" ]+"_"+<16 random characters>. Next, the pub/sub platform can set the custEventRule and custEventSource fields in this record of table 142 according to the pair of custom event signature strings. Then, the pub/sub platform can perform a query (e.g., a SQL query and/or the like) on tables 142, 144, and 146 to identify InputEvent records (and the corresponding custEvtLink link entity records) that are reachable from the relevant custEvents record. These can indicate which (if any) input events were previously configured to trigger the rule set currently being modified or created.

The pub/sub platform can compare the set of input events identified by the above query and input event signatures identified by the configuration information. The pub/sub platform can perform this comparison to ensure that the desired signatures match the queried signatures of data structure 138. If there is an exact match, then no adjustment of data structure 138 is necessary. If there are one or more input event signatures in the configuration information that are not returned by the above query, then the processing platform can create links in table 146 to the desired InputEvent object(s) of table 144. Additionally, or alternatively, the pub/sub platform can determine that the desired input event record exists. If the desired input event record does not exist, then this can indicate that this is the first time that the pub/sub platform has been configured with a rule set to be triggered by the event signature.

If the input event signature is not in the InputEvent table (e.g., table 144), the pub/sub platform can add a record identifying the event signature to tables 144 and 146. The record in table 146 can identify a mapping between the input event signature and the pair of custom event signature strings described above. The pub/sub platform can deploy forwarder rules to accounts of the pub/sub platform that are identified by table 150. The pub/sub platform can add a record to table 148 linking the input event signature and the corresponding accounts of table 150 associated with the input event signature.

In some cases, the pub/sub platform can identify an input event object record of table 144 that is associated with a custom event object record of table 142 and that is not identified by the configuration information. This can indicate that the custom event object is no longer to be triggered by the corresponding input event object signature. In this case, the pub/sub platform can delete the corresponding link entity record of table 146. However, in some cases, there can still be other custom event records that should be triggered by events associated with the input event object signature, and in other cases, there can be no other custom event objects to be triggered by events associated with the input event object signature. To determine whether other custom event objects are to be triggered by the input event object signature, the pub/sub platform can perform a query to identify records of table 146 that link to the input event object signature record with which the custom event record of interest is no longer linked. If one or more such link records still exist, then there are other custom events that are still linked with the input event object signature. If no such link records are identified, then the pub/sub platform can delete the input event object signature record and/or remove the corresponding forwarder rules from accounts of the pub/sub platform. Furthermore, the pub/sub platform can delete the corresponding records of table 148 that are associated with the input event object signature.

In some implementations, the pub/sub platform can update a deployment scope of a rule set based on receiving an indication to update the deployment scope. For example, the pub/sub platform can provide an application programming interface (API) that supports an indication (e.g., a call) to cause the deployment scope to be updated. This can be useful, for example, to cause a deployment of a particular rule set to be widened from a development account group to all accounts associated with the pub/sub platform. In this way, processor resources that would otherwise be used to perform a resource-intensive rebuild of table 142 and/or other tables can be conserved by causing a single value of table 142 (e.g., the deployment scope of a rule set or the account group associated with the rule set) to be updated.

In some implementations, the pub/sub platform can decommission or delete a rule set based on receiving an indication to decommission or delete the rule set. For example, the pub/sub platform can provide an API that supports an indication (e.g., a call) to cause the rule set to be decommissioned or deleted. In some cases, when bottom-up configuration information that modifies a rule set with a particular stable name is received, the pub/sub system can update the custom event signature or input event signature for the rule set with the particular stable name, and can update a rule for the broker module so that input event objects are handled using the updated version of the rule set. In other words, the pub/sub platform might not always delete an original version of the rule set. This can conserve processing resources that would otherwise be used to needlessly delete the existing version of the rule set, since the updated rule set and/or the updated rule for the broker module can cause input event objects to be properly handled by the updated rule set irrespective of whether the existing version of the rule set is deleted.

However, in some cases, it can be desirable to cause the pub/sub platform to delete or decommission an existing version of a rule set (e.g., to conserve storage space, to eliminate outdated or redundant table entries, etc.). The indication to delete or decommission a rule set can accomplish this by causing the pub/sub platform to delete a rule set table entry corresponding to the rule set, to adjust other table entries (e.g., input event object table entries, and/or the like) so that the rule set is removed, to adjust deployed forward rules of particular accounts so that the rule set is removed, and/or the like. In this way, storage space can be conserved and efficiency of the data structure 138 can be improved relative to storing outdated or unused rule sets.

As indicated above, FIGS. 1A-1D are provided as examples. Other examples can differ from what is described with regard to FIGS. 1A-1D.

Figure 2:
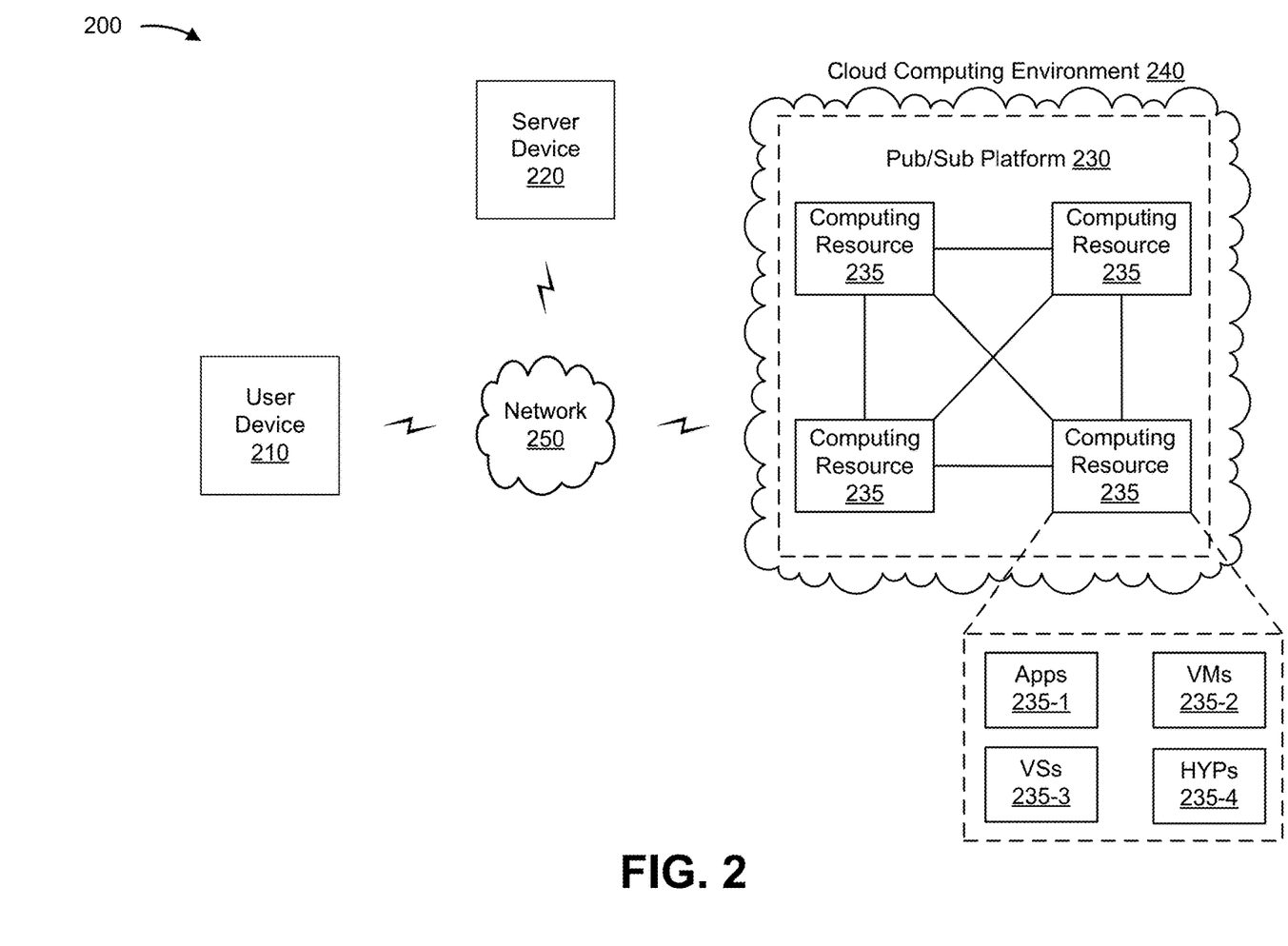
FIG. 2 is a diagram of an example environment in which systems and/or methods described herein can be implemented.

FIG. 2 is a diagram of an example environment 200 in which systems and/or methods, described herein, can be implemented. As shown in FIG. 2, environment 200 can include a user device 210, a server device 220, a pub/sub platform 230, a computing resource 235, a cloud computing environment 240, and a network 250. Devices of environment 200 can interconnect via wired connections, wireless connections, or a combination of wired and wireless connections.

User device 210 includes one or more devices capable of receiving, generating, storing, processing, and/or providing information associated with an event corresponding to an input event object or an action based on a custom event object. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Server device 220 includes one or more devices capable of storing, processing, and/or routing information associated with a data structure, such as a data structure identifying custom event signatures corresponding to input event objects. In some implementations, server device 220 can include a communication interface that allows server device 220 to receive information from and/or transmit information to other devices in environment 200.

Pub/sub platform 230 includes one or more computing resources assigned to a pub/sub system. For example, pub/sub platform 230 can be a platform implemented by cloud computing environment 240 that can publish event objects for subscribers to classes of the event objects in accordance with the implementations described herein. In some implementations, pub/sub platform 230 is implemented by computing resources 235 of cloud computing environment 240.

Pub/sub platform 230 can include a server device or a group of server devices. In some implementations, pub/sub platform 230 can be hosted in cloud computing environment 240. Notably, while implementations described herein describe pub/sub platform 230 as being hosted in cloud computing environment 240, in some implementations, pub/sub platform 230 can be non-cloud-based or can be partially cloud-based.

Cloud computing environment 240 includes an environment that delivers computing as a service, whereby shared resources, services, etc. can be provided to user device 210, server device 220, and/or pub/sub platform 230. Cloud computing environment 240 can provide computation, software, data access, storage, and/or other services that do not require end-user knowledge of a physical location and configuration of a system and/or a device that delivers the services. As shown, cloud computing environment 240 can include pub/sub platform 230.

Computing resource 235 includes one or more personal computers, workstation computers, server devices, or another type of computation and/or communication device. In some implementations, computing resource 235 can host pub/sub platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by user device 210. Application 235-1 can eliminate a need to install and execute the software applications on user device 210. For example, application 235-1 can include software associated with pub/sub platform 230 and/or any other software capable of being provided via cloud computing environment 240. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program, and can support a single process. In some implementations, virtual machine 235-2 can execute on behalf of a user (e.g., user device 210), and can manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
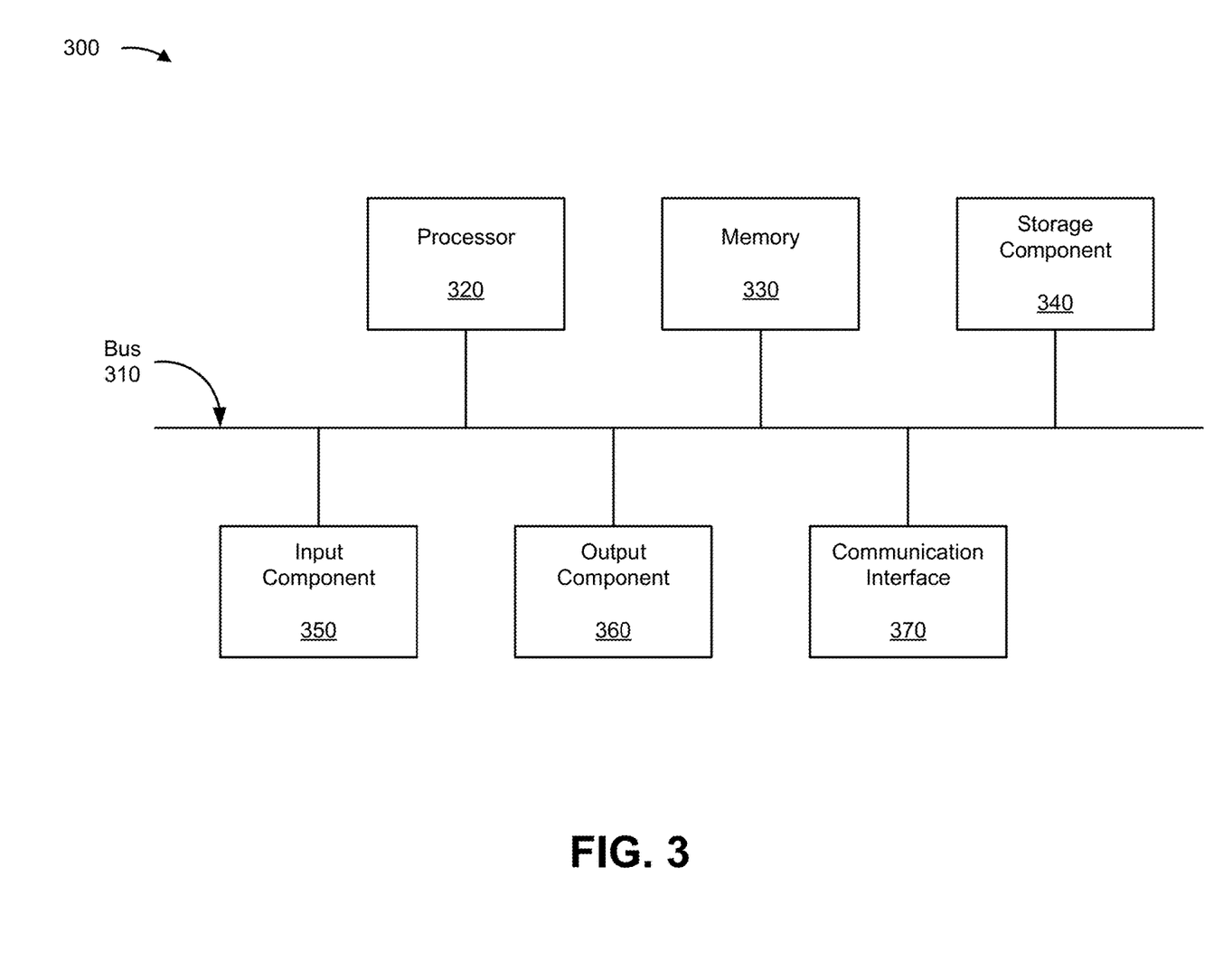
FIG. 3 is a diagram of example components of one or more devices of FIG. 2.

FIG. 3 is a diagram of example components of a device 300. Device 300 can correspond user device 210, server device 220, pub/sub platform 230, and/or computing resource 235. In some implementations user device 210, server device 220, pub/sub platform 230, and/or computing resource 235 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or the like), a solid state drive, a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
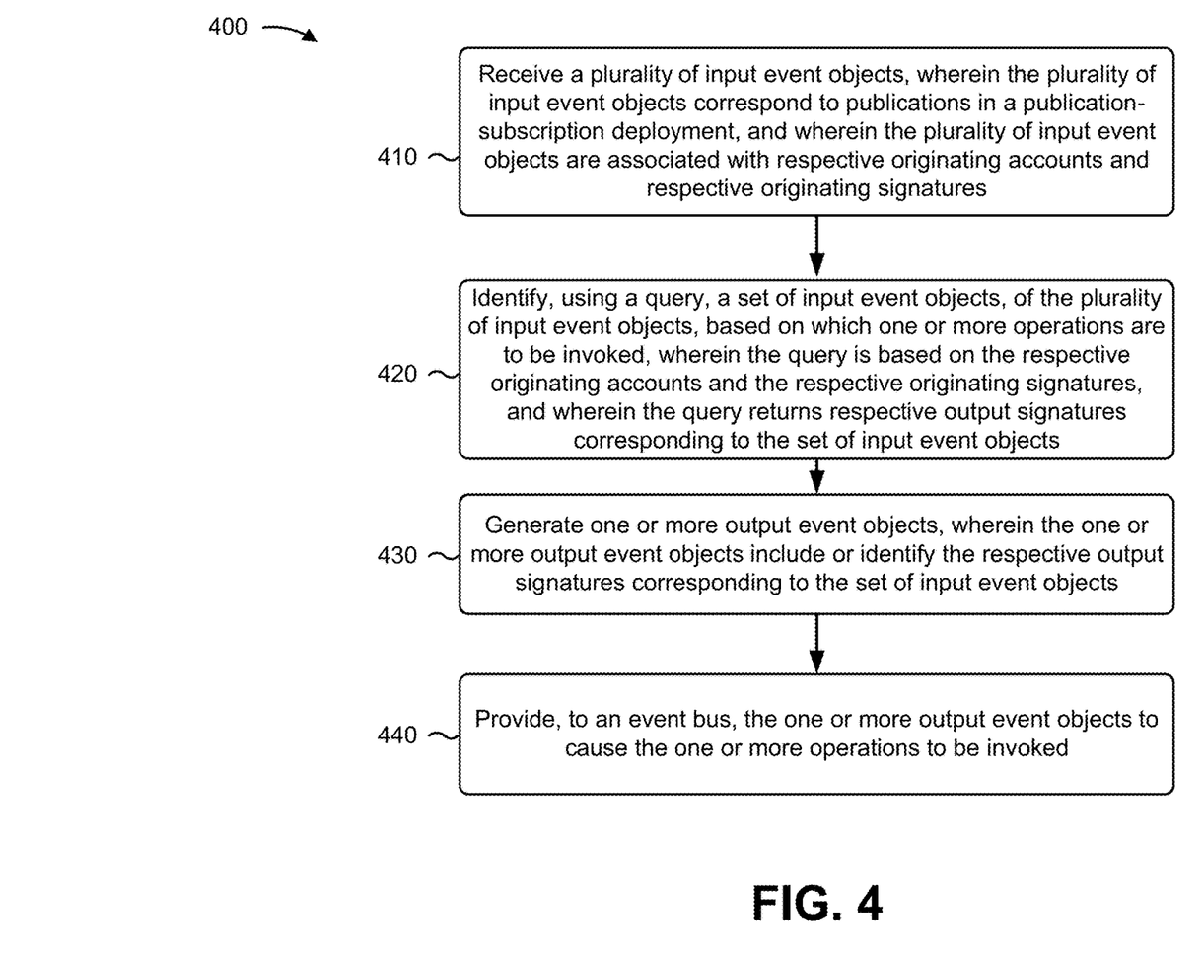
FIG. 4 is a flow chart of an example process for selective execution of rule sets in a pub/sub system.

FIG. 4 is a flow chart of an example process 400 for selective execution of rule sets in a pub/sub system. In some implementations, one or more process blocks of FIG. 4 can be performed by a pub/sub platform (e.g., pub/sub platform 230). In some implementations, one or more process blocks of FIG. 4 can be performed by another device or a group of devices separate from or including a pub/sub platform (e.g., pub/sub platform 230), such as a user device (e.g., user device 210), a server device (e.g. server device 220), and a computing resource (e.g., computing resource 235).

As shown in FIG. 4, process 400 can include receiving a plurality of input event objects, wherein the plurality of input event objects correspond to publications in a publication-subscription deployment, and wherein the plurality of input event objects are associated with respective originating accounts and respective originating signatures (block 410). For example, the pub/sub platform (e.g., using computing resource 235, processor 320, memory 330, storage component 340, input component 350, communication interface 370, and/or the like) can receive a plurality of input event objects, as described above. In some implementations, the plurality of input event objects correspond to publications in a publication-subscription deployment. In some implementations, the plurality of input event objects are associated with respective originating accounts and respective originating signatures.

As further shown in FIG. 4, process 400 can include identifying, using a query, a set of input event objects, of the plurality of input event objects, based on which one or more operations are to be invoked, wherein the query is based on the respective originating accounts and the respective originating signatures, and wherein the query returns respective output signatures corresponding to the set of input event objects (block 420). For example, the pub/sub platform (e.g., using computing resource 235, processor 320, memory 330, storage component 340, communication interface 370, and/or the like) can identify, using a query, a set of input event objects, of the plurality of input event objects, based on which one or more operations are to be invoked, as described above. In some implementations, the query is based on the respective originating accounts and the respective originating signatures. In some implementations, the query returns respective output signatures corresponding to the set of input event objects.

As further shown in FIG. 4, process 400 can include generating one or more output event objects, wherein the one or more output event objects include or identify the respective output signatures corresponding to the set of input event objects (block 430). For example, the pub/sub platform (e.g., using computing resource 235, processor 320, memory 330, storage component 340, and/or the like) can generate one or more output event objects, as described above. In some implementations, the one or more output event objects include or identify the respective output signatures corresponding to the set of input event objects.

As further shown in FIG. 4, process 400 can include providing, to an event bus, the one or more output event objects to cause the one or more operations to be invoked (block 440). For example, the pub/sub platform (e.g., using computing resource 235, processor 320, memory 330, storage component 340, output component 360, communication interface 370, and/or the like) can provide, to an event bus, the one or more output event objects to cause the one or more operations to be invoked, as described above.

Process 400 can include additional implementations, such as any single implementation or any combination of implementations described below and/or in connection with one or more other processes described elsewhere herein.

In some implementations, the set of input event objects can be selected based on a set of respective originating accounts, of the respective originating accounts, from which the set of input event objects originate. In some implementations, the set of respective originating accounts can be associated with a particular account group, and the set of input event objects can be selected based on the particular account group.

In some implementations, the query can return the respective output signatures based on a relationship between the respective output signatures, the respective originating signatures, and the particular account group. In some implementations, the set of input event objects can be selected based on a parameter or criterion associated with the set of input event objects. In some implementations, the parameter or criterion can be identified by the query.

In some implementations, the pub/sub platform can receive first configuration information and second configuration information, where the first configuration information identifies global configuration information for the publication-subscription deployment and the second configuration information is for the one or more operations, and where the one or more output event objects are generated based on the first configuration information and the second configuration information.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a plurality of input event objects,
      wherein the plurality of input event objects correspond to publications in a publication-subscription deployment, and
      wherein the plurality of input event objects are associated with respective originating accounts and respective originating signatures;
   identifying, by the device and using a query, a set of input event objects, of the plurality of input event objects, based on which one or more operations are to be invoked,
      wherein the query is based on the respective originating accounts and the respective originating signatures, and
      wherein the query returns respective output signatures corresponding to the set of input event objects;
   generating, by the device, one or more output event objects,
      wherein the one or more output event objects include or identify the respective output signatures corresponding to the set of input event objects;
   providing, by the device and to an event bus, the one or more output event objects to cause the one or more operations to be invoked by one or more subscribers of the publication-subscription deployment; and
   receiving, by the device, first configuration information and second configuration information,
      wherein the first configuration information identifies global configuration information for the publication-subscription deployment, wherein the second configuration information is for the one or more operations, and wherein the one or more output event objects are generated based on the first configuration information and the second configuration information.

2. The method of claim 1, wherein the set of input event objects are selected based on a set of respective originating accounts, of the respective originating accounts, from which the set of input event objects originate.

3. The method of claim 2, wherein the set of respective originating accounts are associated with a particular account group, and wherein the set of input event objects are selected based on the particular account group.

4. The method of claim 3, wherein the query returns the respective output signatures based on a relationship between the respective output signatures, the respective originating signatures, and the particular account group.

5. The method of claim 1, wherein the set of input event objects are selected based on a parameter or criterion associated with the set of input event objects.

6. The method of claim 5, wherein the parameter or criterion is identified by the query.

7. The method of claim 1, wherein the plurality of input event objects are further associated with at least one of respective event types or respective event object tags; and
wherein the query is based on the at least one of the respective event types or the respective event object tags.

8. A device, comprising:
a memory; and
one or more processors, operatively coupled to the memory, to:
receive a plurality of input event objects,
wherein the plurality of input event objects correspond to publications in a publication-subscription deployment, and
wherein the plurality of input event objects are associated with respective originating accounts and respective originating signatures;
identify, using a query, a set of input event objects, of the plurality of input event objects, based on which one or more operations are to be invoked,
wherein the query is based on the respective originating accounts and the respective originating signatures, and
wherein the query returns respective output signatures corresponding to the set of input event objects;
generate one or more output event objects,
wherein the one or more output event objects include or identify the respective output signatures corresponding to the set of input event objects;
provide, to an event bus, the one or more output event objects to cause the one or more operations to be invoked by one or more subscribers of the publication-subscription deployment; and
receive first configuration information and second configuration information,
wherein the first configuration information identifies global configuration information for the publication-subscription deployment,
wherein the second configuration information is for the one or more operations, and
wherein the one or more output event objects are generated based on the first configuration information and the second configuration information.

9. The device of claim 8, wherein the set of input event objects are selected based on a set of respective originating accounts, of the respective originating accounts, from which the set of input event objects originate.

10. The device of claim 9, wherein the set of respective originating accounts are associated with a particular account group, and wherein the set of input event objects are selected based on the particular account group.

11. The device of claim 10, wherein the query returns the respective output signatures based on a relationship between the respective output signatures, the respective originating signatures, and the particular account group.

12. The device of claim 8, wherein the set of input event objects are selected based on a parameter or criterion associated with the set of input event objects.

13. The device of claim 12, wherein the parameter or criterion is identified by the query.

14. The device of claim 8, wherein the plurality of input event objects are further associated with at least one of respective event types or respective event object tags; and
wherein the query is based on the at least one of the respective event types or the respective event object tags.

15. A non-transitory computer-readable medium storing one or more instructions, the one or more instructions comprising:
one or more instructions that, when executed by one or more processors of a device, cause the one or more processors to:
receive a plurality of input event objects,
wherein the plurality of input event objects correspond to publications in a publication-subscription deployment, and
wherein the plurality of input event objects are associated with respective originating accounts and respective originating signatures;
identify, using a query, a set of input event objects, of the plurality of input event objects, based on which one or more operations are to be invoked,
wherein the query is based on the respective originating accounts and the respective originating signatures, and
wherein the query returns respective output signatures corresponding to the set of input event objects;
generate one or more output event objects,
wherein the one or more output event objects include or identify the respective output signatures corresponding to the set of input event objects;
provide, to an event bus, the one or more output event objects to cause the one or more operations to be invoked by one or more subscribers of the publication-subscription deployment; and
receive first configuration information and second configuration information,
wherein the first configuration information identifies global configuration information for the publication-subscription deployment,
wherein the second configuration information is for the one or more operations, and
wherein the one or more output event objects are generated based on the first configuration information and the second configuration information.

16. The non-transitory computer-readable medium of claim 15, wherein the set of input event objects are selected based on a set of respective originating accounts, of the respective originating accounts, from which the set of input event objects originate.

17. The non-transitory computer-readable medium of claim 16, wherein the set of respective originating accounts are associated with a particular account group, and wherein the set of input event objects are selected based on the particular account group.

18. The non-transitory computer-readable medium of claim 17, wherein the query returns the respective output signatures based on a relationship between the respective output signatures, the respective originating signatures, and the particular account group.

19. The non-transitory computer-readable medium of claim 15, wherein the set of input event objects are selected based on a parameter or criterion associated with the set of input event objects.

20. The non-transitory computer-readable medium of claim 19,
   wherein the parameter or criterion is identified by the query.

\* \* \* \* \*